US008981994B2

(12) United States Patent
Sorenson

(10) Patent No.: US 8,981,994 B2
(45) Date of Patent: Mar. 17, 2015

(54) PROCESSING SIGNALS

(75) Inventor: Karsten Vandborg Sorenson, Stockholm (SE)

(73) Assignee: Skype, Dublin (IE)

( * ) Notice: Subject to any disclaimer, the term of this patent is extended or adjusted under 35 U.S.C. 154(b) by 415 days.

(21) Appl. No.: 13/307,852

(22) Filed: Nov. 30, 2011

(65) Prior Publication Data

US 2013/0082875 A1 Apr. 4, 2013

(30) Foreign Application Priority Data

Sep. 30, 2011 (GB) .................................. 1116848.1

(51) Int. Cl.

| | |
|---|---|
| ***H01Q 3/01*** | (2006.01) |
| ***H01Q 3/44*** | (2006.01) |
| ***G10K 11/34*** | (2006.01) |
| ***H04R 1/40*** | (2006.01) |
| ***H04R 3/00*** | (2006.01) |
| *G10L 21/0216* | (2013.01) |
| *G10L 15/22* | (2006.01) |
| *G10L 21/0208* | (2013.01) |

(52) U.S. Cl.
CPC ................ *G10K 11/34* (2013.01); *H04R 1/406* (2013.01); *H04R 3/005* (2013.01); *G10L 2021/02161* (2013.01); *G10L 2015/225* (2013.01); *G10L 2021/02082* (2013.01); *H04R 2201/403* (2013.01); *H04R 2430/23* (2013.01)
USPC ........................................... 342/368; 342/373

(58) Field of Classification Search
CPC .................................. H01Q 3/26; H01Q 3/40
USPC ....................... 342/81, 368, 372, 373; 381/92
See application file for complete search history.

(56) References Cited

U.S. PATENT DOCUMENTS

| | | | |
|---|---|---|---|
| 4,849,764 | A | 7/1989 | van Heyningen |
| 5,208,864 | A | 5/1993 | Kaneda |
| 5,524,059 | A | 6/1996 | Zurcher |
| 6,157,403 | A | 12/2000 | Nagata |
| 6,232,918 | B1 | 5/2001 | Wax et al. |
| 6,339,758 | B1 | 1/2002 | Kanazawa et al. |
| 6,914,854 | B1 | 7/2005 | Heberley et al. |
| 8,249,862 | B1 | 8/2012 | Cheng et al. |

(Continued)

FOREIGN PATENT DOCUMENTS

| | | |
|---|---|---|
| CA | 2413217 | 5/2004 |
| CN | 100446530 | 3/2001 |

(Continued)

OTHER PUBLICATIONS

"International Search Report", Mailed Date: May 8, 2013, Application No. PCT/US2012/058147, Filed date: Sep. 29, 2012, pp. 9.

(Continued)

*Primary Examiner* — Dao Phan
(74) *Attorney, Agent, or Firm* — Sonia Cooper; Jim Ross; Micky Minhas

(57) ABSTRACT

Mobile device, method and computer program product for processing signals at the mobile device. The signals are received at a plurality of signal sensors of the mobile device. Motion of the mobile device is sensed and the received signals are processed using beamforming means at the mobile device, in dependence upon their direction of arrival at the plurality of signal sensors and in dependence upon the sensed motion of the mobile device.

21 Claims, 4 Drawing Sheets

(56) References Cited

U.S. PATENT DOCUMENTS

| | | | |
|---|---|---|---|
| 8,325,952 B2 | 12/2012 | Cho | |
| 8,401,178 B2 | 3/2013 | Chen et al. | |
| 8,620,388 B2 | 12/2013 | Hayakawa et al. | |
| 8,891,785 B2 | 11/2014 | Sorensen | |
| 2002/0015500 A1 | 2/2002 | Belt et al. | |
| 2002/0103619 A1 | 8/2002 | Bizjak | |
| 2002/0171580 A1 | 11/2002 | Gaus et al. | |
| 2004/0125942 A1 | 7/2004 | Beaucoup et al. | |
| 2004/0213419 A1 | 10/2004 | Varma et al. | |
| 2005/0149339 A1 | 7/2005 | Tanaka et al. | |
| 2005/0216258 A1 | 9/2005 | Kobayashi et al. | |
| 2005/0232441 A1 | 10/2005 | Beaucoup et al. | |
| 2006/0015331 A1 | 1/2006 | Hui et al. | |
| 2006/0031067 A1 | 2/2006 | Kaminuma | |
| 2006/0133622 A1 | 6/2006 | Chen | |
| 2006/0153360 A1 | 7/2006 | Kellermann | |
| 2006/0269073 A1 | 11/2006 | Mao | |
| 2007/0164902 A1 | 7/2007 | Bang et al. | |
| 2008/0039146 A1 | 2/2008 | Jin | |
| 2008/0199025 A1 | 8/2008 | Amada | |
| 2008/0232607 A1 | 9/2008 | Tashev et al. | |
| 2008/0260175 A1 | 10/2008 | Elko | |
| 2009/0010453 A1 | 1/2009 | Zurek et al. | |
| 2009/0076810 A1 | 3/2009 | Matsuo | |
| 2009/0076815 A1 | 3/2009 | Ichikawa et al. | |
| 2009/0125305 A1 | 5/2009 | Cho | |
| 2009/0274318 A1 | 11/2009 | Ishibashi et al. | |
| 2009/0304211 A1 | 12/2009 | Tashev et al. | |
| 2010/0014690 A1 | 1/2010 | Wolff et al. | |
| 2010/0027810 A1 | 2/2010 | Marton | |
| 2010/0070274 A1 | 3/2010 | Cho et al. | |
| 2010/0081487 A1 | 4/2010 | Chen et al. | |
| 2010/0128892 A1 | 5/2010 | Chen et al. | |
| 2010/0150364 A1 | 6/2010 | Buck et al. | |
| 2010/0177908 A1 | 7/2010 | Seltzer et al. | |
| 2010/0215184 A1 | 8/2010 | Buck et al. | |
| 2010/0217590 A1 | 8/2010 | Nemer et al. | |
| 2010/0246844 A1 | 9/2010 | Wolff | |
| 2010/0296665 A1 | 11/2010 | Ishikawa et al. | |
| 2010/0315905 A1 | 12/2010 | Lee et al. | |
| 2010/0323652 A1 | 12/2010 | Visser et al. | |
| 2011/0038486 A1 | 2/2011 | Beaucoup | |
| 2011/0038489 A1 | 2/2011 | Visser et al. | |
| 2011/0054891 A1 | 3/2011 | Vitte et al. | |
| 2011/0070926 A1 | 3/2011 | Vitte et al. | |
| 2011/0158418 A1 | 6/2011 | Bai et al. | |
| 2011/0178798 A1 | 7/2011 | Flaks et al. | |
| 2012/0182429 A1* | 7/2012 | Forutanpour et al. | 348/175 |
| 2012/0303363 A1 | 11/2012 | Sorensen | |
| 2013/0013303 A1 | 1/2013 | Strommer et al. | |
| 2013/0034241 A1* | 2/2013 | Pandey et al. | 381/92 |
| 2013/0083832 A1 | 4/2013 | Sorensen | |
| 2013/0083934 A1 | 4/2013 | Åhgren | |
| 2013/0083936 A1 | 4/2013 | Sorensen | |
| 2013/0083942 A1 | 4/2013 | Åhgren et al. | |
| 2013/0083943 A1 | 4/2013 | Sorensen et al. | |
| 2013/0129100 A1 | 5/2013 | Sorensen | |
| 2013/0136274 A1 | 5/2013 | Åhgren | |
| 2013/0148821 A1 | 6/2013 | Sorensen | |

FOREIGN PATENT DOCUMENTS

| | | | |
|---|---|---|---|
| CN | 1406066 | | 3/2003 |
| CN | 1809105 | | 7/2006 |
| CN | 1835416 | | 9/2006 |
| CN | 1885848 | | 12/2006 |
| CN | 101015001 | | 8/2007 |
| CN | 101018245 | | 8/2007 |
| CN | 101207663 | | 6/2008 |
| CN | 100407594 | | 7/2008 |
| CN | 101278596 | | 10/2008 |
| CN | 101625871 | | 1/2010 |
| CN | 101667426 | | 3/2010 |
| CN | 101828410 | | 9/2010 |
| CN | 102111697 | | 6/2011 |
| CN | 102131136 | | 7/2011 |
| CN | 1540903 | | 10/2014 |
| DE | 19943872 | A1 | 3/2001 |
| EP | 0002222 | | 6/1979 |
| EP | 0654915 | | 5/1995 |
| EP | 1722545 | | 11/2006 |
| EP | 1919251 | | 5/2008 |
| EP | 1930880 | | 6/2008 |
| EP | 2026329 | | 2/2009 |
| EP | 2159791 | A1 | 3/2010 |
| EP | 2175446 | | 4/2010 |
| EP | 2197219 | | 6/2010 |
| EP | 2222091 | | 8/2010 |
| EP | 2339574 | A1 | 6/2011 |
| JP | 2006109340 | | 4/2006 |
| JP | 2006319448 | | 11/2006 |
| JP | 2006333069 | | 12/2006 |
| JP | 2010232717 | | 10/2010 |
| WO | WO-0018099 | | 3/2000 |
| WO | WO-03010996 | | 2/2003 |
| WO | WO-2007127182 | | 11/2007 |
| WO | WO-2008041878 | | 4/2008 |
| WO | WO-2008062854 | | 5/2008 |
| WO | WO-2010098546 | | 9/2010 |
| WO | WO-2012097314 | | 7/2012 |

OTHER PUBLICATIONS

Goldberg, et al., "Joint Direction-of-Arrival and Array-Shape Tracking for Multiple Moving Targets", Retrieved at <<http://www.mirlab.org/conference_papers/International_Conference/ICASSP%201997/pdf/scan/ic970511.pdf>>, In IEEE International Conference on Acoustics, Speech, and Signal Processing, Apr. 21, 1997, pp. 4.

"International Search Report and Written Opinion", Application No. PCT/US2013/058144, (Sep. 11, 2013),10 pages.

"Non-Final Office Action", U.S. Appl. No. 13/212,633, (Nov. 1, 2013),14 pages.

"Non-Final Office Action", U.S. Appl. No. 13/212,688, (Nov. 7, 2013),14 pages.

Knapp, et al., "The Generalized Correlation Method for Estimation of Time Delay", *IEEE Transactions on Acoustics, Speech, and Signal Processing*, vol. ASSP-24, No. 4, (Aug. 1976), pp. 320-327.

"Search Report", Application No. GB1116846.5, Jan. 28, 2013, 3 pages.

"Search Report", GB Application No. 1116840.8, Jan. 29, 2013, 3 pages.

"Search Report", GB Application No. 1116843.2, Jan. 30, 2013, 3 pages.

"Search Report", GB Application No. 1116869.7, Feb. 7, 2013, 3 pages.

"Search Report", GB Application No. 1121147.1, Feb. 14, 2013, 5 pages.

"UK Search Report", UK Application No. GB1116848.1, Dec. 18, 2012, 3 pages.

"PCT Search Report and Written Opinion", Application No. PCT/US/2012/045556, Jan. 2, 2013, 10 pages.

"PCT Search Report and Written Opinion", Application No. PCT/US2012/058146, Jan. 21, 2013, 9 pages.

"PCT Search Report and Written Opinion", Application No. PCT/US2012/066485, Feb. 15, 2013, 12 pages.

"PCT Search Report and Written Opinion", Application No. PCT/US2012/2065737, Feb. 13, 2013, 12 pages.

"PCT Search Report and Written Opinion", Application No. PCT/US2012/058145, Apr. 24, 2013, 18 pages.

Grbic, Nedelko et al., "Soft Constrained Subband Beamforming for Hands-Free Speech Enhancement", In *Proceedings of ICASSP 2002*, May 13, 2002, 4 pages.

"Search Report", GB Application No. 1108885.3, Sep. 3, 2012, 3 pages.

"Search Report", GB Application No. 1111474.1, Oct. 24, 2012, 3 pages.

"Search Report", GB Application No. 1116847.3, Dec. 20, 2012, 3 pages.

(56) References Cited

OTHER PUBLICATIONS

"International Search Report and Written Opinion", Application No. PCT/US2012/068649, Mar. 7, 2013, 9 pages.
"PCT Search Report and Written Opinion", Application No. PCT/US2012/058148, May 3, 2013, 9 pages.
"PCT Search Report and Written Opinion", Application No. PCT/US2012/058143, Dec. 21, 2012,12 pages.
Handzel, et al., "Biomimetic Sound-Source Localization", *IEEE Sensors Journal*, vol. 2, No. 6, Dec. 2002, pp. 607-616.
Kellerman, W. "Strategies for Combining Acoustic Echo Cancellation and Adaptive Beamforming Microphone Arrays", In *Proceedings of ICASSP 1997*, Apr. 1997, pp. 219-222.
"Foreign Office Action", CN Application No. 201210377130.8, Jan. 15, 2014, 12 pages.
"International Search Report and Written Opinion", Application No. PCT/EP2012/059937, Feb. 14, 2014, 9 pages.
"Non-Final Office Action", U.S. Appl. No. 13/327,308, Mar. 28, 2014, 13 pages.
"Notice of Allowance", U.S. Appl. No. 13/307,994, Apr. 1, 2014, 7 pages.
"Foreign Office Action", CN Application No. 201210368101.5, Dec. 6, 2013, 9 pages.
"Non-Final Office Action", U.S. Appl. No. 13/307,994, Dec. 19, 2013, 12 pages.
"Non-Final Office Action", U.S. Appl. No. 13/341,610, Dec. 27, 2013, 10 pages.
"Search Report", GB Application No. 1119932.0, Feb. 28, 2013, 8 pages.
"Corrected Notice of Allowance", U.S. Appl. No. 13/307,994, Jun. 24, 2014, 2 pages.
"Final Office Action", U.S. Appl. No. 13/212,633, May 23, 2014, 16 pages.
"Final Office Action", U.S. Appl. No. 13/212,688, Jun. 5, 2014, 20 pages.
"Final Office Action", U.S. Appl. No. 13/341,610, Jul. 17, 2014, 7 pages.
"Foreign Office Action", CN Application No. 201210368224.9, Jun. 5, 2014, 11 pages.
"Non-Final Office Action", U.S. Appl. No. 13/308,165, Jul. 17, 2014, 14 pages.
"Non-Final Office Action", U.S. Appl. No. 13/308,210, Aug. 18, 2014, 6 pages.
"Notice of Allowance", U.S. Appl. No. 13/308,106, Jun. 27, 2014, 7 pages.
"Supplemental Notice of Allowance", U.S. Appl. No. 13/307,994, Aug. 8, 2014, 2 pages.
"Non-Final Office Action", U.S. Appl. No. 13/327,250, Sep. 15, 2014, 10 pages.
"Foreign Office Action", CN Application No. 201210367888.3, Jul. 15, 2014, 13 pages.
"Foreign Office Action", CN Application No. 201210485807.X, Oct. 8, 2014, 10 pages.
"Foreign Office Action", CN Application No. 201210521742.X, Oct. 8, 2014, 16 pages.
"Foreign Office Action", CN Application No. 201210377115.3, Aug. 27, 2014, 18 pages.
"Foreign Office Action", CN Application No. 201210377130.8, Sep. 28, 2014, 7 pages.
Goldberg, et al.,' "Joint Direction-of-Arrival and Array-Shape Tracking for Multiple Moving Targets", IEEE International Conference on Acoustic, Speech, and Signal Processing, Apr. 25, 1997, 4 pages.
"Non-Final Office Action", U.S. Appl. No. 13/212,633, Nov. 28, 2014, 16 pages.
"Final Office Action", U.S. Appl. No. 13/327,308, Dec. 2, 2014, 6 pages.

* cited by examiner

PROCESSING SIGNALS

RELATED APPLICATION

This application claims priority under 35 U.S.C. §119 or 365 to Great Britain, Application No. GB1116848.1, filed Sep. 30, 2011.

The entire teachings of the above application are incorporated herein by reference.

TECHNICAL FIELD

The present invention relates to processing signals. In particular, the present invention relates to processing signals using a beamformer.

BACKGROUND

A device may have input means that can be used to receive transmitted signals from the surrounding environment. For example, a device may have audio input means such as a microphone that can be used to receive audio signals from the surrounding environment. For example, a microphone of a user device may receive a primary audio signal (such as speech from a user) as well as other audio signals. The other audio signals may be interfering audio signals received at the microphone of the device, and may be received from an interfering source or may be ambient background noise or microphone self-noise. The interfering audio signals may disturb the primary audio signals received at the device. The device may use the received audio signals for many different purposes. For example, where the received audio signals are speech signals received from a user, the speech signals may be processed by the device for use in a communication event, e.g. by transmitting the speech signals over a network to another device which may be associated with another user of the communication event. Alternatively, or additionally, the received audio signals could be used for other purposes, as is known in the art.

In other examples, a device may have receiving means for receiving other types of transmitted signals, such as radar signals, sonar signals, antenna signals, radio waves, microwaves and general broadband signals or narrowband signals. The same situations can occur for these other types of transmitted signals whereby a primary signal is received as well as interfering signals at the receiving means. The description below is provided mainly in relation to the receipt of audio signals at a device, but the same principles will apply for the receipt of other types of transmitted signals at a device, such as general broadband signals, general narrowband signals, radar signals, sonar signals, antenna signals, radio waves and microwaves as described above.

In order to improve the quality of the received audio signals, (e.g. the speech signals received from a user for use in a call), it is desirable to suppress interfering audio signals (e.g. background noise and interfering audio signals received from interfering audio sources) that are received at the microphone of the user device.

The use of stereo microphones and other microphone arrays in which a plurality of microphones operate as a single audio input means is becoming more common. The use of a plurality of microphones at a device enables the use of extracted spatial information from the received audio signals in addition to information that can be extracted from an audio signal received by a single microphone. When using such devices one approach for suppressing interfering audio signals is to apply a beamformer to the audio signals received by the plurality of microphones. Beamforming is a process of focusing the audio signals received by a microphone array by applying signal processing to enhance particular audio signals received at the microphone array from one or more desired directions. For simplicity we will describe the case with only a single desired direction herein, but the same method will apply when there are more directions of interest. The beamforming is achieved by first estimating the angle from which the desired audio signal is received at the microphone, so-called Direction of Arrival ("DOA") information. Adaptive beamformers use the DOA information to process the audio signals received by the plurality of microphones to form a "beam" whereby a high gain is applied in a direction from which the desired audio signal is received by the microphones and a low gain is applied in other directions.

While the beamformer will attempt to suppress the unwanted audio signals coming from unwanted directions, the number of microphones as well as the shape and the size of the microphone array will limit the effect of the beamformer, and as a result the unwanted audio signals are suppressed, but may remain audible. The output of the beamformer can be further processed in the device in the same way as a received audio signal from a single microphone may be processed, e.g. for transmission to another device as part of a communication event. For example, the output of the beamformer may be supplied as an input signal to at least one of an echo cancellation stage, an Automatic Gain Control (AGC) processing stage and a single channel noise reduction stage in the device.

The beamformer can be steered to focus on particular directions from which the primary audio signals are expected to be received. For example, the microphone array may be placed on a desk in a particular position and a user may often sit in a particular position at the desk such that speech signals from the user tend to arrive at the microphone array with approximately the same direction of arrival (the "principal direction of arrival"). The beamformer can be steered towards this principal direction of arrival to thereby focus on the speech signals received at the microphone array from the user and to apply greater levels of attenuation to audio signals received at the microphone array from other directions. The beamformer can adaptively alter its direction of focus to better match the direction of arrival of the primary audio signals during use, but this can be a computationally complex process and takes time for the adaptation to take place. It can therefore be beneficial to pre-steer the beamformer correctly to the principal direction of arrival prior to use.

SUMMARY

In recent years, the size, weight and cost of electronic components has reduced such that it is now feasible to implement many devices as mobile devices. Mobile devices may have microphones implemented in them for receiving audio signals. For example, mobile phones, laptops, tablets and other mobile devices can be carried by a user and may implement microphones for receiving audio signals. As described above, the implementation of multiple microphones enables the use of beamforming methods. The inventors have realized that it would be advantageous to implement a beamformer in a mobile device, but that there may be a problem with correctly steering a beamformer implemented in a mobile device because mobile devices are inherently intended to be moved. In particular, the inventors have realized that it would be useful to adjust beamformer coefficients, which are applied to audio signals by a beamformer, when a mobile device is moved. In this way, the beampattern of the beamformer may focus on the primary audio signal(s) received by the microphones even when the mobile device is moved. For use in a mobile device, a beamforming method is preferably able to track the new conditions whenever the device is moved.

The inventors have further realized that motion sensors can be implemented within mobile devices which can be used to sense the motion of the mobile device. For example, gyroscopes and accelerometers may be implemented in a mobile device to sense the rotational and linear motion of the mobile device. An output from a motion sensor can be used by the beamformer in order to adjust the beamformer coefficients to account for motion of the mobile device such that the beamformer focuses on the primary audio signal(s) as the mobile device is moved. This allows a beamformer to be implemented in a successful manner in a mobile device. Smartphones and tablet computers are examples of mobile devices that often have a gyroscope, an accelerometer and multiple microphones. Furthermore, it is likely that in the future more laptops will be equipped with similar hardware.

According to a first aspect of the invention there is provided a mobile device comprising: a plurality of signal sensors for receiving signals; beamforming means for processing the received signals in dependence upon their direction of arrival at the plurality of signal sensors; motion sensor means for sensing motion of the mobile device and for providing an indication of the sensed motion of the mobile device to the beamforming means, wherein the beamforming means are arranged to process the received signals in dependence upon the indication of the sensed motion of the mobile device.

The signals may be audio signals and the signal sensors may be microphones for receiving the audio signals. The signals may alternatively be any other type of transmitted signal, such as general broadband signals, general narrowband signals, radar signals, sonar signals, antenna signals, radio waves and microwaves.

Advantageously, because the beamforming means uses the indication of the sensed motion of the mobile device, the beamforming means can more accurately steer a beampattern of the beamforming means towards a primary (or "desired") signal, such as a speech signal from a user, as the mobile device is moved.

The signals may comprise: (i) at least one primary signal having a respective at least one principal direction of arrival at the plurality of signal sensors, and (ii) interfering signals having respective interfering directions of arrival at the plurality of signal sensors. Furthermore, the beamforming means may comprise means for applying a beampattern to the received signals to thereby apply greater levels of suppression to signals received with the interfering directions of arrival than to signals received with the at least one principal direction of arrival.

The beamforming means may be configured to track the interfering directions of arrival using the indication of the sensed motion of the mobile device, and to adapt the beamformer coefficients (and thereby changing the beampattern) accordingly to thereby suppress the interfering signals received at the signal sensors with the interfering directions of arrival. Similarly, the beamforming means may be configured to track the at least one principal direction of arrival using the indication of the sensed motion of the mobile device, and to adapt the beamformer coefficients (and thereby changing the beampattern) accordingly to thereby enhance the at least one primary signal received at the signal sensors with the respective at least one principal direction of arrival.

The motion sensor means may comprise at least one of a gyroscope and an accelerometer for sensing the motion of the mobile device. The gyroscope may be used for sensing rotational motion of the mobile device and the accelerometer may be used for sensing acceleration of the mobile device. Using gyroscope and accelerometer information for tracking a direction of arrival of interfering sources can aid the beamforming means in more quickly applying attenuation to audio signals received by the plurality of signal sensors from an interfering source while the device is being moved, e.g., as a user of the mobile device carries the mobile device while talking. The indication of the sensed motion of the mobile device from the motion sensor means is particularly useful for tracking stationary sources of interference as the mobile device is moved, but is also useful for tracking sources of interference that are non-stationary since the motion of the mobile device can be accounted for by the sensed motion indication thereby simplifying the task of tracking the motion of the non-stationary interfering source.

According to a second aspect of the invention there is provided a method of processing signals at a mobile device, the method comprising: receiving the signals at a plurality of signal sensors of the mobile device; sensing motion of the mobile device; and processing the received signals, using beamforming means at the mobile device, in dependence upon their direction of arrival at the plurality of signal sensors and in dependence upon the sensed motion of the mobile device.

According to a third aspect of the invention there is provided a computer program product for processing signals received at a plurality of signal sensors of a mobile device, the computer program product being embodied on a non-transient computer-readable medium and configured so as when executed on a processor of the mobile device to perform the steps of: receiving an indication of a sensed motion of the mobile device from motion sensing means of the mobile device; and implementing beamforming means to process the received signals in dependence upon their direction of arrival at the plurality of signal sensors and in dependence upon the indication of the sensed motion of the mobile device.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Preferred embodiments of the invention will now be described by way of example only. The embodiments described below relate to the case where the signals are audio signals. However, other embodiments relate to cases where the signals are other types of transmitted signals, such as general broadband signals, general narrowband signals, radar signals, sonar signals, antenna signals, radio waves and microwaves.

In the following embodiments of the invention, techniques are described in which a motion sensor is used to provide indications of the motion of a mobile device to a beamformer, such that the beamformer coefficients can be adapted based on the motion of the mobile device. This allows the beamformer to be implemented in a mobile device and aids the beamformer in focusing on the desired audio signals even when the mobile device is moved.

Figure 1:
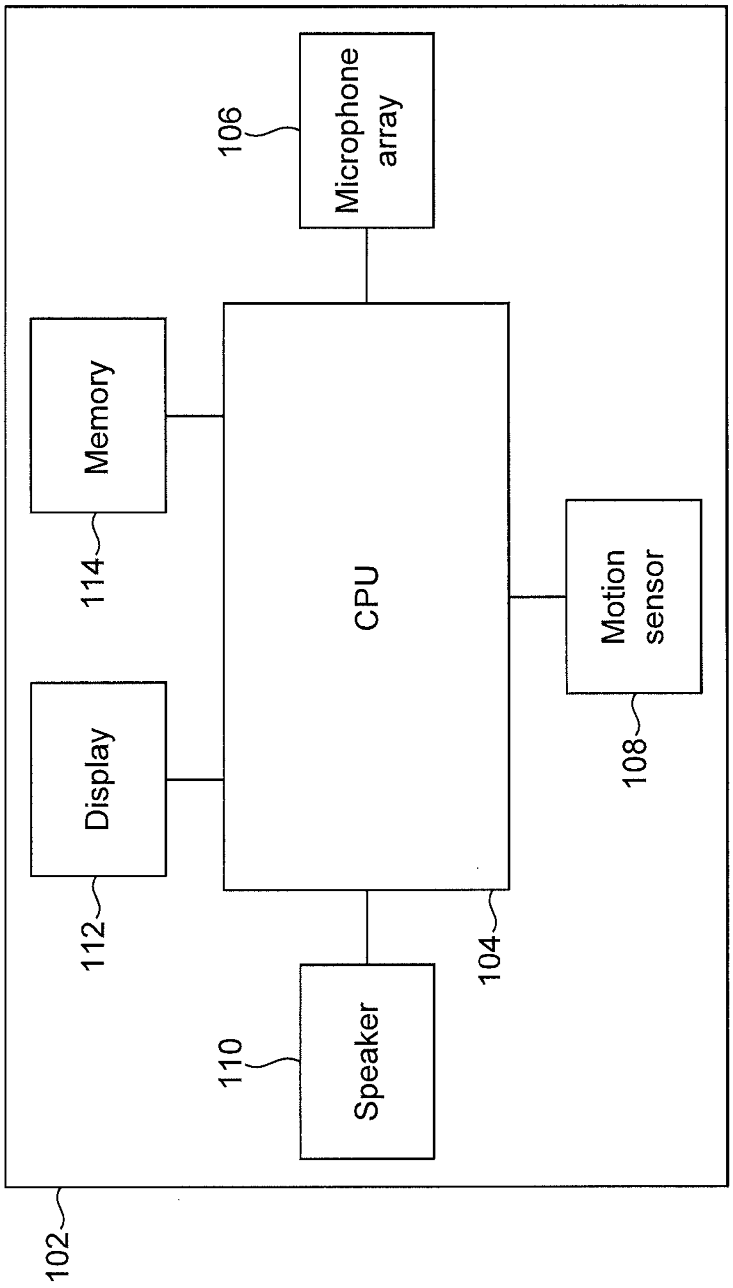
FIG. 1 shows a schematic view of a mobile device according to a preferred embodiment.

Reference is first made to FIG. 1 which illustrates a schematic view of a mobile device 102. The mobile device 102 is a portable device. The mobile device 102 comprises a CPU 104, to which is connected a microphone array 106 for receiving audio signals, a motion sensor 108 for sensing motion of the mobile device 102, a speaker 110 for outputting audio signals, a display 112 such as a screen for outputting visual data to a user of the mobile device 102 and a memory 114 for storing data.

Figure 2:
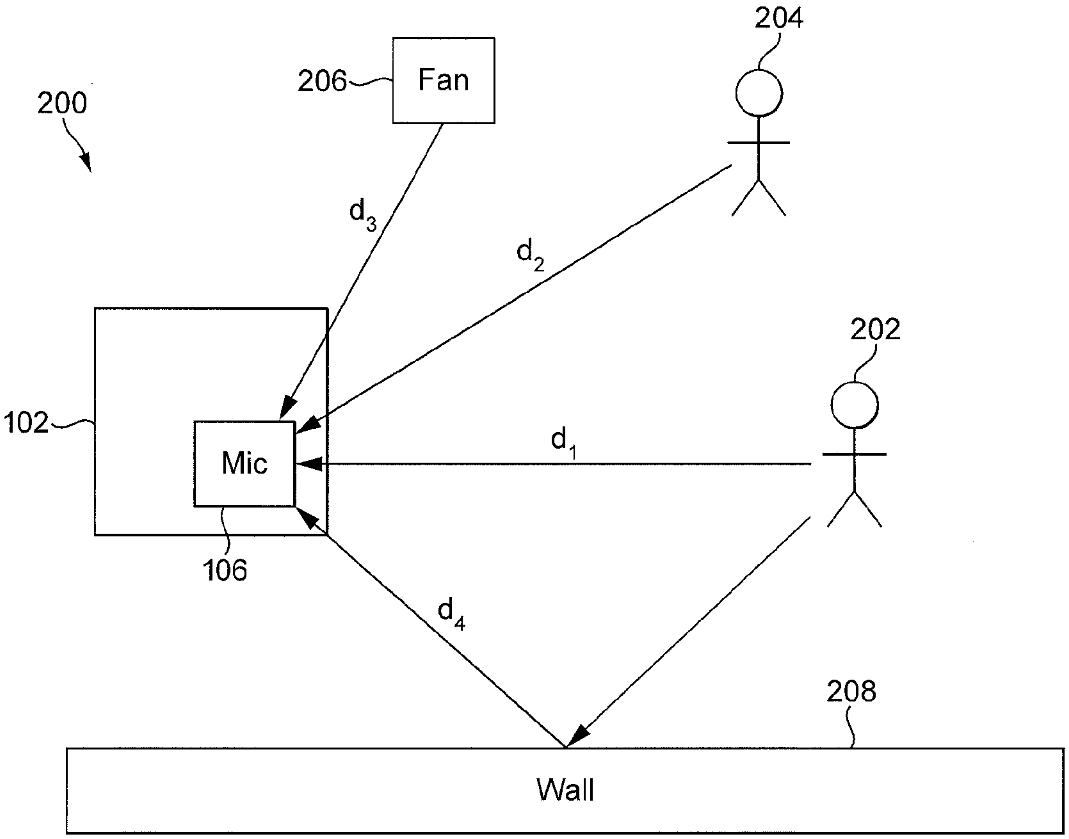
FIG. 2 shows a system according to a preferred embodiment.

Reference is now made to FIG. 2, which illustrates an example environment 200 in which the mobile device 102 operates.

The microphone array 106 of the mobile device receives audio signals from the environment 200. For example, as shown in FIG. 2, the microphone array 106 receives audio signals from a user 202 (as denoted $d_1$ in FIG. 2), audio signals from another user 204 (as denoted $d_2$ in FIG. 2), audio signals from a fan 206 (as denoted $d_3$ in FIG. 2) and audio signals from the user 202 reflected off a wall 208 (as denoted $d_4$ in FIG. 2). It will be apparent to a person skilled in the art that the microphone array 106 may receive other audio signals than those shown in FIG. 2. In the scenario shown in FIG. 2 the audio signals from the user 202 are the desired audio signals, and all the other audio signals which are received at the microphone array 106 are interfering audio signals. In other embodiments more than one of the audio signals received at the microphone array 106 may be considered "desired" audio signals, but for simplicity, in the embodiments described herein there is only one desired audio signal (that being the audio signal from user 202) and the other audio signals are considered to be interference. FIG. 2 shows interference sources being another user 204, a fan 206 or a reflection from a wall 208. Other sources of unwanted noise signals may include for example air-conditioning systems, and a device playing music.

The desired audio signal(s) is identified when the audio signals are processed after having been received at the microphone array 106. During processing, desired audio signals are identified based on the detection of speech like characteristics, and a principal direction of a main speaker is determined. In FIG. 2 where the main speaker (user 202) is shown as the source of the desired audio signal that arrives at the microphone array 106 from the principal direction $d_1$.

Figure 3:
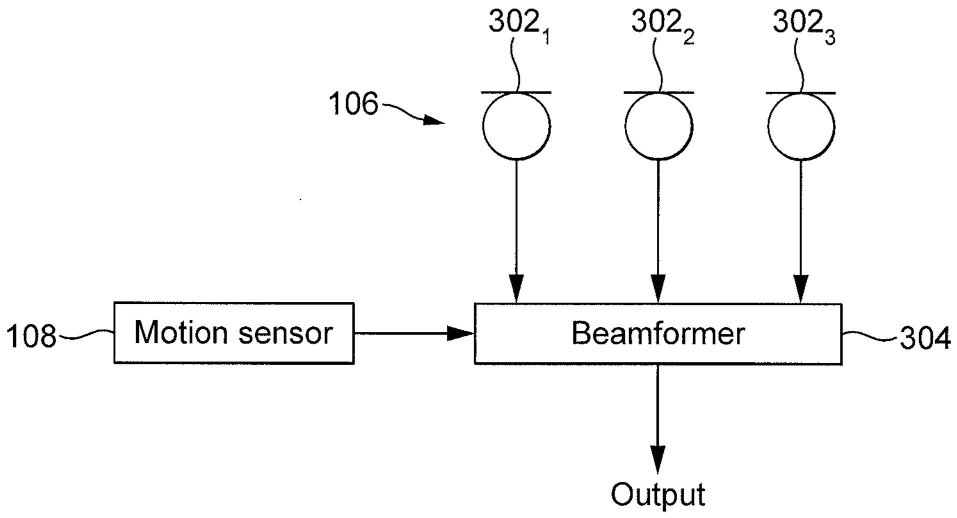
FIG. 3 shows a functional block diagram of a mobile device according to a preferred embodiment.

Reference is now made to FIG. 3 which illustrates a functional representation of the mobile device 102. The microphone array 106 comprises a plurality of microphones 302$_1$, 302$_2$ and 302$_3$. The mobile device 102 further comprises a beamformer 304. The beamformer 304 may be implemented in software executed on the CPU 104 or implemented in hardware in the mobile device 102. The output of each microphone in the microphone array 106 is coupled to a respective input of the beamformer 304. The beamformer 304 has a beampattern which can be applied to the received audio signals. The beamformer 304 can be adapted to thereby change the beampattern. Persons skilled in the art will appreciate that multiple inputs are needed in order to implement beamforming. The microphone array 106 is shown in FIG. 3 as having three microphones (302$_1$, 302$_2$ and 302$_3$), but it will be understood that this number of microphones is merely an example and is not limiting in any way.

The beamformer 304 includes processing means for receiving and processing the audio signals from the microphones of the microphone array 106. For example, the beamformer 304 may comprise a voice activity detector (VAD) and a DOA estimation block. In operation the beamformer 304 ascertains the nature of the audio signals received by the microphone array 106 and based on detection of speech like qualities detected by the VAD and the DOA estimation block, one or more principal direction(s) of the main speaker(s) is determined. In the example shown in FIG. 2 the direction of audio signals ($d_1$) received from the user 202 is determined to be the principal direction. The beamformer 304 uses the DOA information to process the audio signals by forming a beam that has a high gain in the direction from the principal direction ($d_1$) from which wanted signals are received at the microphone array 106 and a low gain in the directions to any other signal sources (e.g. $d_1$, $d_2$ and $d_3$). Whilst it has been described above that the beamformer 304 can determine any number of principal directions, the number of principal directions determined affects the properties of the beamformer e.g. for a large number of principal directions the beamformer 304 will apply less attenuation of the signals received at the microphone array from the other (unwanted) directions than if only a single principal direction is determined. The output of the beamformer 304 is provided to further processing means of the mobile device 102 in the form of a single channel to be processed. The output of the beamformer 304 may be used in many different ways in the mobile device 102 as will be apparent to a person skilled in the art. For example, the output of the beamformer 304 could be used as part of a communication event in which the user 202 is participating using the mobile device 102.

The output of the beamformer 304 may be subject to further signal processing (such as automatic gain control and noise suppression). The details of such further signal processing is beyond the scope of this invention and so the details of the further signal processing are not given herein, but a skilled person would be aware of ways in which the output of the beamformer 304 may be processed in the mobile device 102.

As shown in FIG. 3 an output of the motion sensor 108 is provided to the beamformer 304 (e.g. using the CPU 104). The motion sensor 108 senses motion of the mobile device 102. Movement of the mobile device 102 will affect the directions in which audio signals are received at the microphone array 106, and therefore will affect the beampattern that the beamformer 304 should apply to the received audio signals in order to correctly focus the audio signals in the principal direction (e.g. $d_1$). The beamformer 304 can use indications from the motion sensor 108 of the sensed motion of the mobile device 102 in order to adjust the beamformer coefficients of the beamformer 304 accordingly. One method for controlling the beamformer 304 (e.g. with the purpose of compensating for detected motion of the mobile device 102) is to employ a directional regularization technique. A directional regularization technique may involve including regularization noise in the received audio signals at the beamformer 304 in order to adapt the beamformer coefficients of the beamformer 304, thereby adapting the suppression applied by the beamformer 304 to audio signals having particular directions of arrival information at the microphone array 106. For example the beamformer 304 may modify the received audio signals by including greater levels of regularization noise in the received audio signals corresponding to directions of arrival matching those of the interfering audio signals (e.g. from directions $d_2$, $d_3$ and $d_4$), wherein the filter coefficients of the beamformer 304 are then computed based on the modified audio signals. The signals from the motion sensor 108 can be used to track the directions of arrival of the interfering audio signals (e.g. from directions $d_2$, $d_3$ and $d_4$) as the mobile device 102 moves such that the regularization noise is included correctly in the received audio signals, such that the beamformer coefficients of the beamformer 304 are correctly adapted to thereby suppress the interfering audio signals as the mobile device 102 moves. The motion sensor 108 may be implemented as any sensor for sensing motion of the mobile device, for example a gyroscope and/or an accelerometer or any other type of motion sensor known in the art. The motion sensor can be used to determine the orientation and movement of the mobile device 102 in order to track the directions of arrival of sources of audio signals (e.g. the primary audio source 202 and the interfering audio sources 204, 206 and 208) as the mobile device 102 moves.

Figure 4:
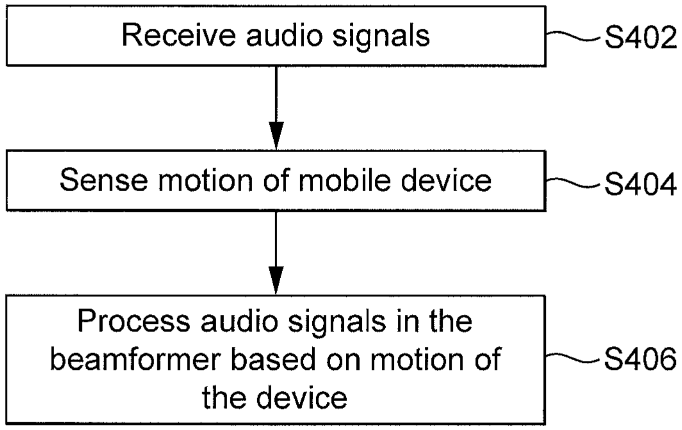
FIG. 4 is a flow chart for a process of processing audio signals according to a preferred embodiment.

With reference to FIG. 4 there is now described a method of processing audio signals according to a preferred embodiment. In step S402 audio signals are received at the microphones (302$_1$, 302$_2$ and 302$_3$) of the microphone array 106. The audio signals are received, for example, from the user 202, the user 204, the fan 206 and the wall 208 as shown in FIG. 2. Other interfering audio signals, such as background noise, may also be received at the microphones (302$_1$, 302$_2$ and 302$_3$) of the microphone array 106. The audio signals received by each microphone (302$_1$, 302$_2$ and 302$_3$) of the microphone array 106 are passed to the beamformer 304.

In step S404 the motion sensor 108 senses motion of the mobile device 102. The orientation and movement of the mobile device 102 can be detected using the motion sensor 108. Indications of the sensed motion of the mobile device 102 are provided from the motion sensor 108 to the beamformer 304.

In step S406 the beamformer 304 processes the audio signals received from the microphones (302$_1$, 302$_2$ and 302$_3$) of the microphone array 106 to thereby apply beamformer coefficients to the received audio signals. The beamformer coefficients describe the attenuation, as a function of angle of receipt of the audio signals at the microphone array 106, which is to be applied to the audio signals by the beamformer 304. The beamformer 304 is adapted thereby changing its beampattern based on the motion of the mobile device 102 as indicated by the input received at the beamformer 304 from the motion sensor 108. The beamformer 304 may track the direction of arrival of audio signals from particular sources. For example the beamformer 304 tracks the direction of arrival (the "principal direction of arrival") of the desired audio signals from the primary audio source, e.g. the user 202, and adjusts the beamformer coefficients in order to focus on audio signals in the principal direction. The indications of the motion of the mobile device 102 are used by the beamformer 304 to track the principal direction of arrival. For example, if the user 202 is stationary whilst the mobile device 102 moves then the signals from the motion sensor 108 can be used to track the principal direction of arrival. Even if the user 202 is not stationary whilst the mobile device 102 moves, the signals from the motion sensor 108 can be used to simplify the tracking of the principal direction of arrival by removing the motion of the mobile device 102 from the tracking calculation. This simplification can make the tracking process faster, more efficient, less computationally complex and less power consuming.

The beamformer 304 may also track the direction of arrival (the "interfering directions of arrival") of the interfering audio signals from the interfering audio sources (e.g. the user 204, the fan 206 and the wall 208) and adjust the beamformer coefficients in order to apply greater levels of attenuation to the interfering audio signals received from the interfering directions of arrival. The indications of the motion of the mobile device 102 are used by the beamformer 304 to track the interfering directions of arrival. For example, if a source of interference is stationary whilst the mobile device 102 moves then the signals from the motion sensor 108 can be used to track the corresponding interfering direction of arrival. Even if a source of interference is not stationary whilst the mobile device 102 moves, the signals from the motion sensor 108 can be used to simplify the tracking of the interfering direction of arrival by removing the motion of the mobile device 102 from the tracking calculation. This simplification can make the tracking process faster, more efficient, less computationally complex and less power consuming.

A skilled person would be aware of techniques which could be used to track the direction of arrival for the primary audio signal and compensate the primary audio signal by means of pre-steering of the microphone array 106. In order to compensate the beamformer for ensuring attenuation of the interfering audio signals a method such as directional regularization as described above could be used. In a directional regularization method the beamformer 304 is adapted to thereby change the beamformer coefficients by modifying the received audio signals by including regularization noise in the received audio signals corresponding to interfering directions of arrival. The beamformer coefficients are then computed based on the modified audio signals such that the beamformer coefficients indicate that the beamformer 304 should apply a greater level of attenuation to audio signals received with the interfering directions of arrival at the microphone array 106. By tracking the motion of the mobile device 102 with the motion sensor 108 the regularization noise used in the directional regularization technique can be included correctly in the received audio signals to thereby correctly attenuate the undesired audio signals even when the mobile device 102 is moving. Directional regularization is just one example of how the beamformer 304 may adaptively attenuate the undesired audio signals as the mobile device 102 is moved, and other techniques for achieving this may be used in other embodiments of the invention.

By using the motion sensor (e.g. gyroscope and accelerometer) information when the mobile device 102 is moving, it is possible for the beamformer 304 to predict how the primary source and the interfering sources in the environment 200 are moving relative to the mobile device 102 itself (i.e. track the primary and interfering sources).

For beamforming it is beneficial to know the directions of arrival of interfering sources to apply attenuation in the directions of the interfering audio signals from those interfering sources. Embodiments of the present invention allow the beamformer coefficients to be changed based on the motion sensor (e.g. gyroscope and accelerometer) information with no additional tracking activity of the beamformer 304 required for tracking the changes. The tracking is therefore simplified. Furthermore, changes in the beamformer coefficients of the beamformer 304 relative to the primary audio signals (i.e. the sources of input power) can be disturbing/distorting for the primary audio signals, and the use of the information from the motion sensor (e.g. gyroscope and accelerometer) can aid the beamformer 304 in adapting the beamformer coefficients quickly in response to motion of the mobile device 102, such that the disturbance/distortion introduced into the primary audio signals by the beamformer 304 can be reduced. In one example, the beamformer 304 is a Minimum Variance Distortionless Response (MVDR) beamformer which minimizes the energy of the output of the beamformer 304 under the constraints of not distorting the primary audio signal(s) received at the microphone array 106 with the principal direction(s) of arrival. An MVDR beamformer is an example where the information from the motion sensor 108 is used to compensate only the main speaker, by pre-steering the microphone array 106. An MVDR beamformer would then have to adapt to any change to the interfering sources. If combined with e.g. the directional regularization method described above, the entire beampattern of the beamformer can be implicitly corrected (by changing the beamformer coefficients) to compensate all known desired and undesired sources.

The operation of direction of arrival (DOA) estimation performed by the beamformer 304 to determine the direction of arrival of an audio signal (e.g. the principal direction of arrival or an interfering direction of arrival) will now be described in more detail with reference to FIG. 5.

The DOA information is estimated by the beamformer 304 by estimating the time delay, e.g. using correlation methods, between received audio signals at the plurality of microphones of the microphone array 106, and estimating the source of the audio signal using the a priori knowledge about the location of the plurality of microphones 302$_1$, 302$_2$ and 302$_3$ of the microphone array 106.

Figure 5:
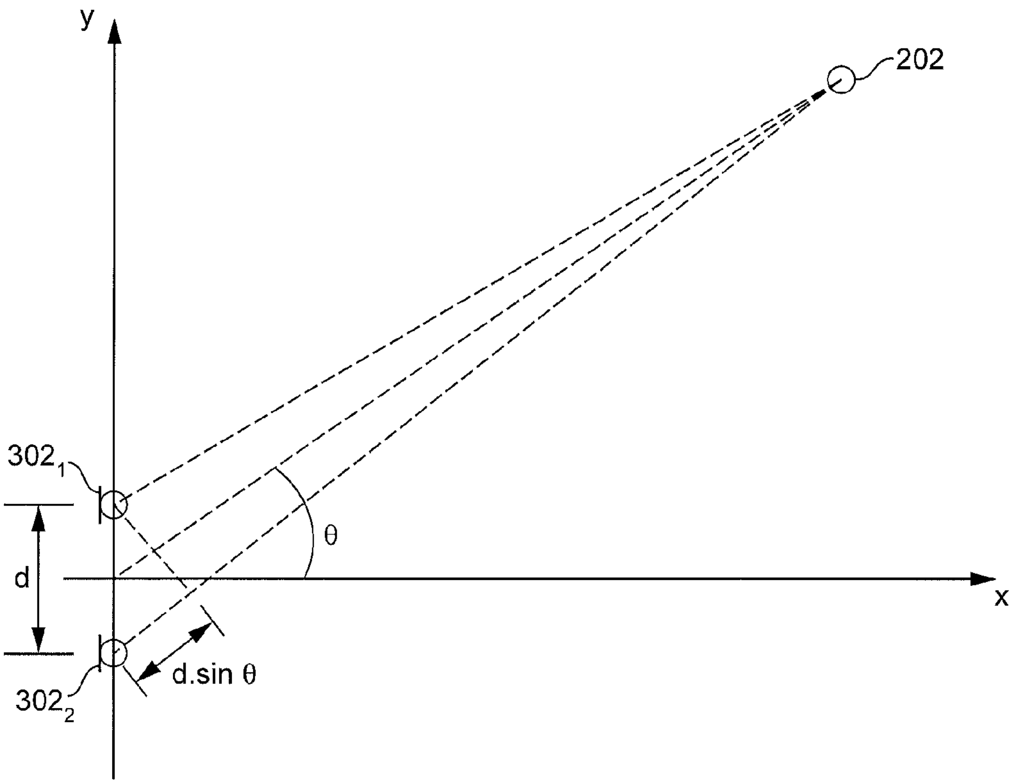
FIG. 5 shows a diagram representing how Direction of Arrival information is estimated in one embodiment.

As an example, FIG. 5 shows microphones 302$_1$ and 302$_2$ of the microphone array 106 receiving audio signals on two separate input channels from the primary audio source 202. For ease of understanding FIG. 5 shows a point source 202 where waves are propagating in a circular motion away from the source 202. This is how it is in real-life, but the equation shown below assumes that the received audio signals are received at the microphones 302$_1$ and 302$_2$ as plane waves. This assumption is a good assumption when the point source 202 is 'far enough' away from the microphones 302$_1$ and 302$_2$. The direction of arrival of the audio signals at microphones 302$_1$ and 302$_2$ separated by a distance, d, can be estimated, under a plane wave assumption, using equation (1):

$$\theta = \arcsin\left(\frac{\tau_D v}{d}\right) \quad (1)$$

where v is the speed of sound, and $\tau_D$ is the difference between the times that the audio signals from the interfering source 204 arrive at the microphones 302$_1$ and 302$_2$—that is, the time delay. The distance, d, is a known parameter for the microphone array 106 and the speed of sound, v, is known (approximately 340 $ms^{-1}$). The time delay, $\tau_D$, is obtained as the time lag that maximises the cross-correlation between the received primary audio signals at the outputs of the microphones 302$_1$ and 302$_2$. The angle, θ, may then be found which corresponds to this time delay using equation (1) given above. Speech characteristics can be detected in audio signals received with the delay of maximum cross-correlation to determine one or more principal direction(s) of a main speaker(s).

It will be appreciated that calculating a cross-correlation of signals is a common technique in the art of signal processing and will not be describe in more detail herein.

In the example embodiment described above the microphone array 106 is a 1-D array of microphones (302$_1$, 302$_2$ and 302$_3$) which allows the beamformer 304 to distinguish between audio signals received with different angles in one dimension (e.g. along a horizontal axis). In alternative embodiments, the microphone array 106 may be a 2-D or a 3-D array of microphones which would allow the beamformer 304 to distinguish between audio signals received with different angles in two or three dimensions respectively (e.g. along horizontal, vertical and depth axes).

As described above, the beamformer 304 may be implemented in software executed on the CPU 104 or implemented in hardware in the mobile device 102. When the beamformer 304 is implemented in software, it may be provided by way of a computer program product embodied on a non-transient computer-readable medium which is configured so as when executed on the CPU 104 of the mobile device 102 to perform the function of the beamformer 304 as described above.

Whilst the embodiments described above have referred to a microphone array 106 receiving one desired audio signal ($d_1$) from a single user 202, it will be understood that the microphone array 106 may receive audio signals from a plurality of users, for example in a conference call which may all be treated as desired audio signals. In this scenario multiple sources of wanted audio signals arrive at the microphone array 106.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A mobile device comprising:

a plurality of signal sensors for receiving signals;

a beamformer configured to process the received signals in dependence upon their direction of arrival at the plurality of signal sensors;

a motion sensor configured to sense motion of the mobile device and to provide an indication of the sensed motion of the mobile device to the beamformer, wherein the beamformer is configured to process the received signals in dependence upon the indication of the sensed motion of the mobile device, wherein the signals comprise: (i) at least one primary signal having a respective at least one principal direction of arrival at the plurality of signal sensors, and (ii) interfering signals having respective interfering directions of arrival at the plurality of signal sensors, wherein the beamformer is configured to apply beamformer coefficients to the received signals to thereby apply greater levels of suppression to signals received with the interfering directions of arrival than to signals received with the at least one principal direction of arrival.

2. The mobile device of claim 1 wherein the beamformer is configured to track the interfering directions of arrival using the indication of the sensed motion of the mobile device, and to adapt the beamformer coefficients accordingly to thereby suppress the interfering signals received at the signal sensors with the interfering directions of arrival.

3. The mobile device of claim 1 wherein the beamformer is configured to track the at least one principal direction of arrival using the indication of the sensed motion of the mobile device, and to adapt the beamformer coefficients accordingly to thereby enhance the at least one primary signal received at the signal sensors with the respective at least one principal direction of arrival.

4. The mobile device of claim 1 wherein the motion sensor comprises at least one of a gyroscope or an accelerometer for sensing the motion of the mobile device.

5. The mobile device of claim 1 wherein the signals are audio signals and the signal sensors are microphones for receiving the audio signals.

6. A method of processing signals at a mobile device, the method comprising:

receiving the signals at a plurality of signal sensors of the mobile device;

sensing motion of the mobile device; and processing the received signals, using a beamformer at the mobile device, in dependence upon their direction of arrival at the plurality of signal sensors and in dependence upon the sensed motion of the mobile device, wherein the signals comprise: (i) at least one primary signal having a respective at least one principal direction of arrival at the plurality of signal sensors, and (ii) interfering signals having respective interfering directions of arrival at the plurality of signal sensors, wherein the processing the received signals comprises the beamformer applying beamformer coefficients to the received signals such that greater levels of suppression are applied to signals received with the interfering directions of arrival than to signals received with the at least one principal direction of arrival.

7. The method of claim 6 further comprising:

tracking the interfering directions of arrival using the sensed motion of the mobile device; and adapting the beamformer coefficients according to said tracking to thereby suppress the interfering signals received at the signal sensors with the interfering directions of arrival.

8. The method of claim 6 further comprising:

tracking the at least one principal direction of arrival using the sensed motion of the mobile device; and adapting the beamformer coefficients according to said tracking to thereby enhance the at least one primary signal received at the signal sensors with the respective at least one principal direction of arrival.

9. The method of claim 6 wherein said sensing the motion of the mobile device comprises at least one of: (i) sensing rotational motion of the mobile device using a gyroscope, or (ii) sensing acceleration of the mobile device using an accelerometer.

10. The method of claim 6 wherein the signals are one of: (i) audio signals, (ii) general broadband signals, (iii) general narrowband signals, (iv) radar signals, (v) sonar signals, (vi) antenna signals, (vii) radio waves or (viii) microwaves.

11. The mobile device of claim 1, wherein the signals are audio signals.

12. The mobile device of claim 1, wherein the signals are general broadband signals.

13. The mobile device of claim 1, wherein the signals are general narrowband signals.

14. The mobile device of claim 1, wherein the signals are radar signals.

15. The mobile device of claim 1, wherein the signals are radio waves.

16. The mobile device of claim 1, wherein the signals are antenna signals.

17. A beamformer for processing signals received at a plurality of signal sensors, the beamformer configured to perform operations comprising:

receiving an indication of a sensed motion from a motion sensor;

processing the received signals in dependence upon their direction of arrival at the plurality of signal sensors and in dependence upon the indication of the sensed motion, wherein the signals comprise: (i) at least one primary signal having a respective at least one principal direction of arrival at the plurality of signal sensors, and (ii) interfering signals having respective interfering directions of arrival at the plurality of signal sensors; and applying beamformer coefficients to the received signals to thereby apply greater levels of suppression to signals received with the interfering directions of arrival than to signals received with the at least one principal direction of arrival.

18. The beamformer of claim 17, further configured to perform operations comprising:

tracking the interfering directions of arrival using the indication of the sensed motion; and adapting the beamformer coefficients accordingly to thereby suppress the interfering signals received at the signal sensors with the interfering directions of arrival.

19. The beamformer of claim 17, further configured to perform operations comprising:

tracking the at least one principal direction of arrival using the indication of the sensed motion; and adapting the beamformer coefficients accordingly to thereby enhance the at least one primary signal received at the signal sensors with the respective at least one principal direction of arrival.

20. The beamformer of claim 17 wherein the motion sensor comprises at least one of a gyroscope or an accelerometer for sensing the motion.

21. The beamformer of claim 17, wherein the signals are audio signals and the signal sensors are microphones for receiving the audio signals.

* * * * *